(12) United States Patent
Jerome

(10) Patent No.: US 6,378,456 B1
(45) Date of Patent: Apr. 30, 2002

(54) SLEEPING BAG FOR PETS

(75) Inventor: Geraldine A. Jerome, Fairview, NC (US)

(73) Assignee: Janay M. Jerome Minor, Asheville, NC (US)

( * ) Notice: Subject to any disclaimer, the term of this patent is extended or adjusted under 35 U.S.C. 154(b) by 0 days.

(21) Appl. No.: 09/514,051

(22) Filed: Feb. 25, 2000

(51) Int. Cl.⁷ .............................................. A01K 29/00
(52) U.S. Cl. ...................... 119/28.5; 5/413 R
(58) Field of Search ................ 119/28.5; D30/118; 2/69.5; 5/413 R

(56) References Cited

U.S. PATENT DOCUMENTS

| | | | |
|---|---|---|---|
| 2,775,222 A | | 12/1956 | Kruck |
| 3,639,931 A | * | 2/1972 | McGuire ................ 5/413 R |
| 3,842,454 A | * | 10/1974 | Young ................ 5/413 R |
| 4,008,687 A | | 2/1977 | Keys |
| 4,169,428 A | | 10/1979 | Waugh |
| 4,893,586 A | | 1/1990 | Carson |
| 5,005,235 A | * | 4/1991 | Huang ................ 5/413 R |
| 5,010,843 A | | 4/1991 | Henry |
| 5,327,851 A | | 7/1994 | Paré et al. |
| D390,686 S | | 2/1998 | Grabowski |
| 5,749,314 A | | 5/1998 | Pelham et al. |
| 5,966,756 A | * | 10/1999 | Cartier ................ 5/413 R |

* cited by examiner

Primary Examiner—Charles T. Jordan
Assistant Examiner—Judith A. Nelson
(74) Attorney, Agent, or Firm—Carter & Schnedler, P.A.

(57) ABSTRACT

There is provided a sleeping bag for pets including an upper fabric member and a lower fabric member, each formed from a plurality of panels which are sewn together. Each fabric member includes first and second side edges which are attached to one another and front edges which are not attached to one another. The front edge of the lower fabric member extends beyond the front edge of the upper fabric member, thereby forming a shelf so that the pet may readily enter the bag. The sleeping bag includes ribs for adding structural strength thereto.

7 Claims, 3 Drawing Sheets

SLEEPING BAG FOR PETS

BACKGROUND OF THE INVENTION

This invention relates to pet accessories. More particularly it relates to sleeping bags for pets.

Household pets, in particularly dogs, are often more comfortable in the winter when they can lie on a fabric surface. While a soft fabric surface will make the pet more comfortable, the exposed portions of the pet become cold. It has been found that pets, in particularly dogs, are more comfortable during the winter if the pet can enter into a sleeping bag, particularly at night.

There have been various attempts to produce sleeping bags for pets. For example, U.S. Pat. No. 4,893,586, issued to Carson, and U.S. Pat. No. 2,775,222, issued to Kruck, show sleeping bags for pets which includes a preformed tunnel to define a permanent opening for the entry of the pet, U.S. Pat. No. 4,008,687, issued to Keys, shows a sleeping nook for house pets in the form of an oversized slipper, U.S. Pat. No. 4,169,428, issued to Waugh, shows a pet sleeping bag in the form of a multiple ply padded sheet of deeply quilted material, U.S. Pat. No. 5,010,843, issued to Henry, shows a pet bed having a pocket formed between adjacent surfaces so that the pet may crawl into the pocket, U.S. Pat. No. 5,749,314, issued to Pelham et al, shows a covered dog bed including a spring member which keeps the bed open, and U.S. Pat. No. 5,327,851, issued to Paré et al, shows an animal sleeping bag having a sleeping compartment made of an opaque air permeable material allowing the animal to safely burrow within. It is believed that none of these sleeping bags have meet with substantial commercial success.

OBJECTS OF THE INVENTION

It is therefore one object of this invention to provide an improved pet sleeping bag.

It is another object of this invention to provide a pet sleeping bag which is simple to manufacture.

It is still another object of this invention to provide a pet sleeping bag which is easy for the pet to use.

It is yet another object of this invention to provide a pet sleeping bag which maintains its shape while being comfortable to the pet.

SUMMARY OF THE INVENTION

In accordance with one form of this invention, there is provided a sleeping bag for pets including an upper fabric member and a lower fabric member. The upper and lower fabric members each have first and second side edges and a front edge. The first side edge of the upper fabric member is attached to the first side edge of the lower fabric member. The second side edge of the upper fabric member is attached to the second side edge of the lower fabric member, thereby forming an enclosure. At least a portion of the first edge of the upper fabric member is not attached to the lower fabric member, thereby forming an opening for the enclosure. The front edge of the lower fabric member extends beyond the front edge of the upper fabric member, thereby forming a shelf from a portion of the lower fabric member, whereby the pet may readily enter the enclosure.

Preferably, the upper and lower fabric members are formed from a plurality of adjacent panels with each adjacent panel being sewn together, forming a valley therebetween. Also, preferably, a rib is included in each valley for providing structural strength for the sleeping bag. In addition, it is preferred that a bordering member is attached to the first and second side edges and the front edges of each fabric member for providing additional structural strength for the sleeping bag. Furthermore, it is preferred that each panel includes upper and lower walls, with a filler material located between the upper and lower walls for providing additional structural strength to the sleeping bag and for providing thermal insulation to help keep the pet warm.

BRIEF DESCRIPTION OF THE DRAWING

The subject matter which is regarded as the invention is set forth in the appended claims. The invention itself, however, together with further objects and advantages thereof may be better understood in reference to the accompanying drawing in which:

DESCRIPTION OF THE PREFERRED EMBODIMENTS

Figure 1:
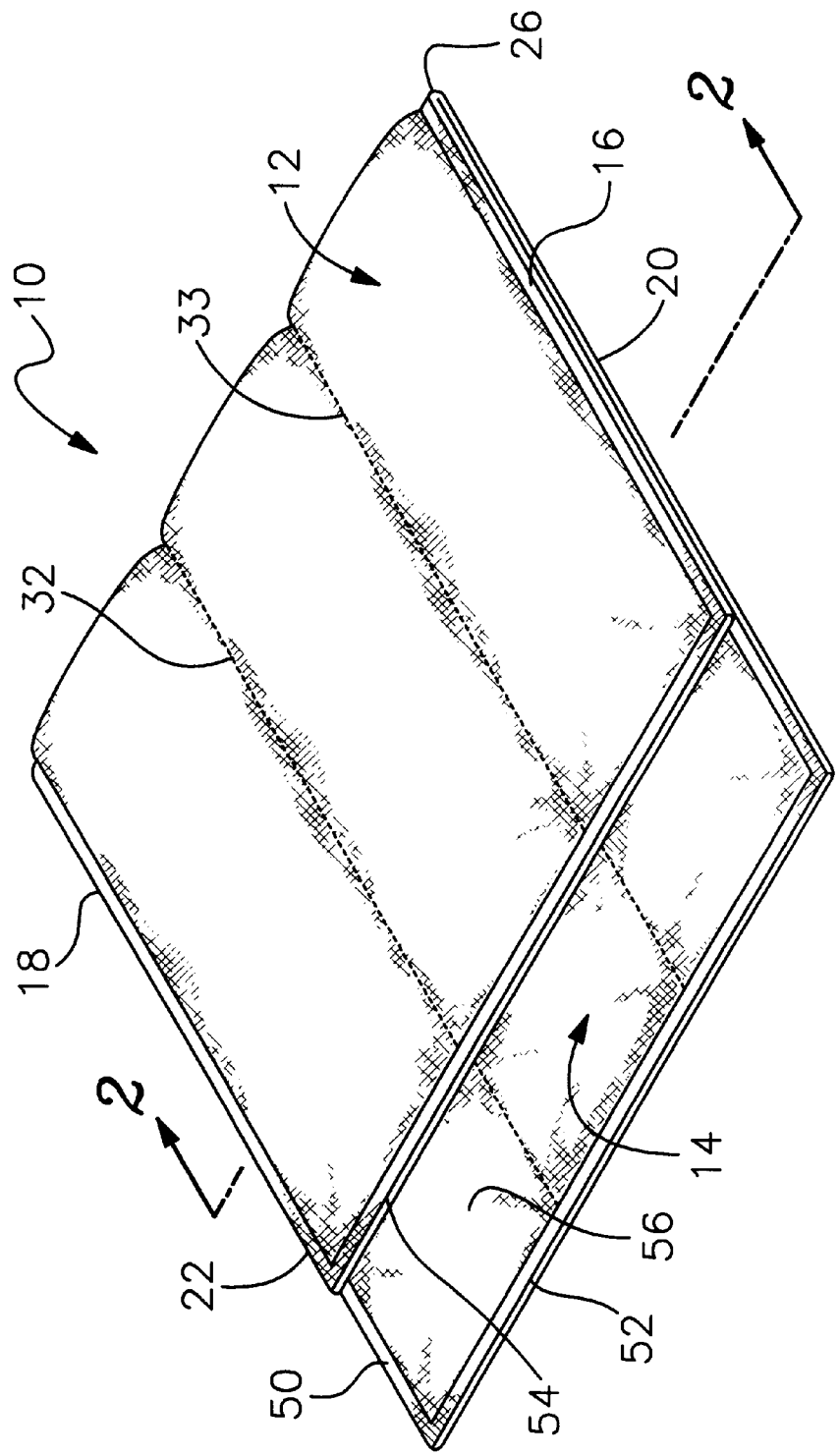
FIG. 1 is a perspective view showing the pet sleeping bag of the subject invention.
Figure 2:
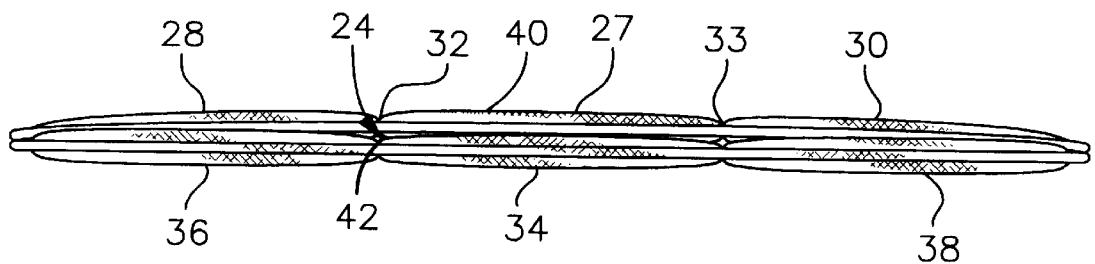
FIG. 2 is a front elevational view of the pet sleeping bag of FIG. 1.

Referring now more particularly to FIG. 1, there is provided pet sleeping bag 10 including upper fabric member 12 and lower fabric member 14. Upper fabric member 12 includes first side edge 16 and second side edge 18. Lower fabric member 14 include first side edge 20 and second side edge 22. First side edge 16 of upper fabric member 12 is sewn to first side edge 20 of lower fabric member 14, as illustrated by stitches 23 shown in FIG. 3. Second side edge 18 of upper fabric member 12 is sewn to second side edge 22 of lower fabric member 14, thereby forming enclosure 24, as shown in FIG. 2.

Figure 3:
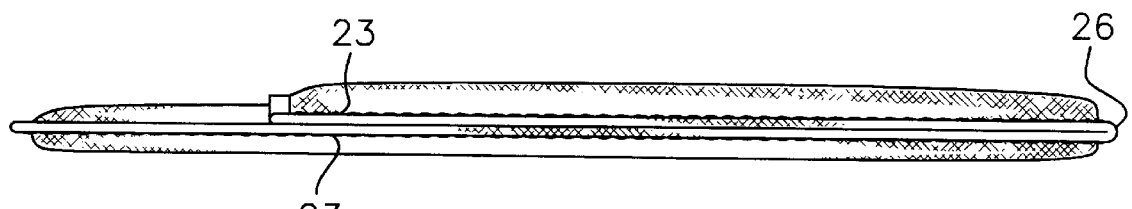
FIG. 3 is a side elevational view of the pet sleeping bag of FIG. 1.

Preferably, upper fabric member 12 and lower fabric member 14 are formed from an elongated multi-panel sheet which is folded at fold 26, as shown in FIG. 3.

Preferably, the elongated sheet which forms the upper and lower fabric members is made by sewing a plurality, and preferably three panels, together. It is also preferred that the panels which are used are so-called baby bed bumper pads which include top and bottom walls and a filler material. A baby bumper pad is used to surround a baby crib which prevents the baby's head from striking the hard crib bars. As can be seen from FIGS. 2 and 4, adjacent panels are sewn together. For example, panel 27, which is a part of upper fabric member 12, is sewn to its left adjacent panel 28 and to its right adjacent panel 30, as indicated by lines 32 and 33 in FIGS. 1 and 2. Panel 34, which is a continuation of panel 27 and is part of lower fabric member 14, is sewn to its left adjacent panel 36, which is a continuation of panel 28, and to its right adjacent panel 38, which is a continuation of panel 38.

Figure 4:
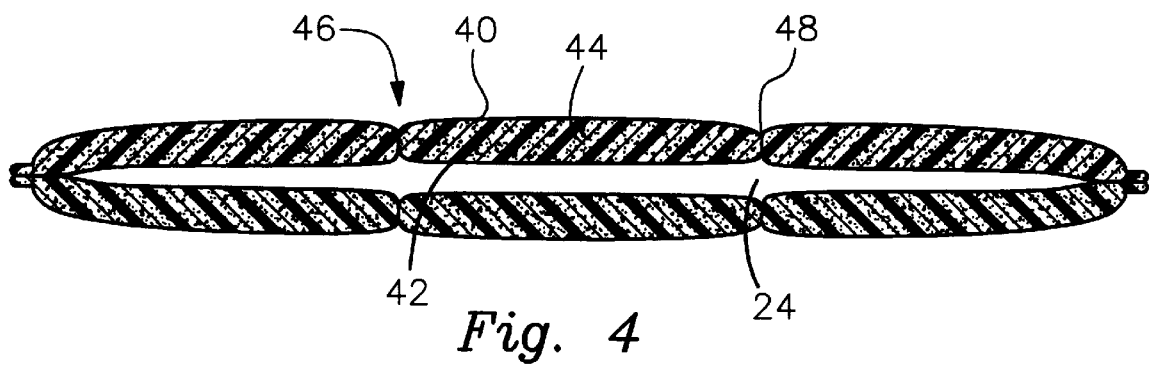
FIG. 4 is a sectional view taken through Section Lines 2—2 of the pet sleeping bag of FIG. 1.

Each panel includes upper wall 40 and a lower wall 42, and is filled with thermal insulation 44, as shown in FIG. 4. The thermal insulation adds structural strength to the sleeping bag, and in addition, provides warmth for the pet.

By sewing the panels together, valleys 46 are formed between each panel. Within each valley, rib member 48 is sewn therein, as best shown in FIG. 4. The rib members also add structural strength to the sleeping bag. In addition, a bordering member 50 is sewn to the front edges of both the upper and lower fabric members, as well as to the side edges of both the upper and lower fabric members. The bordering member also provides additional structural strength to the sleeping bag.

Figure 5:
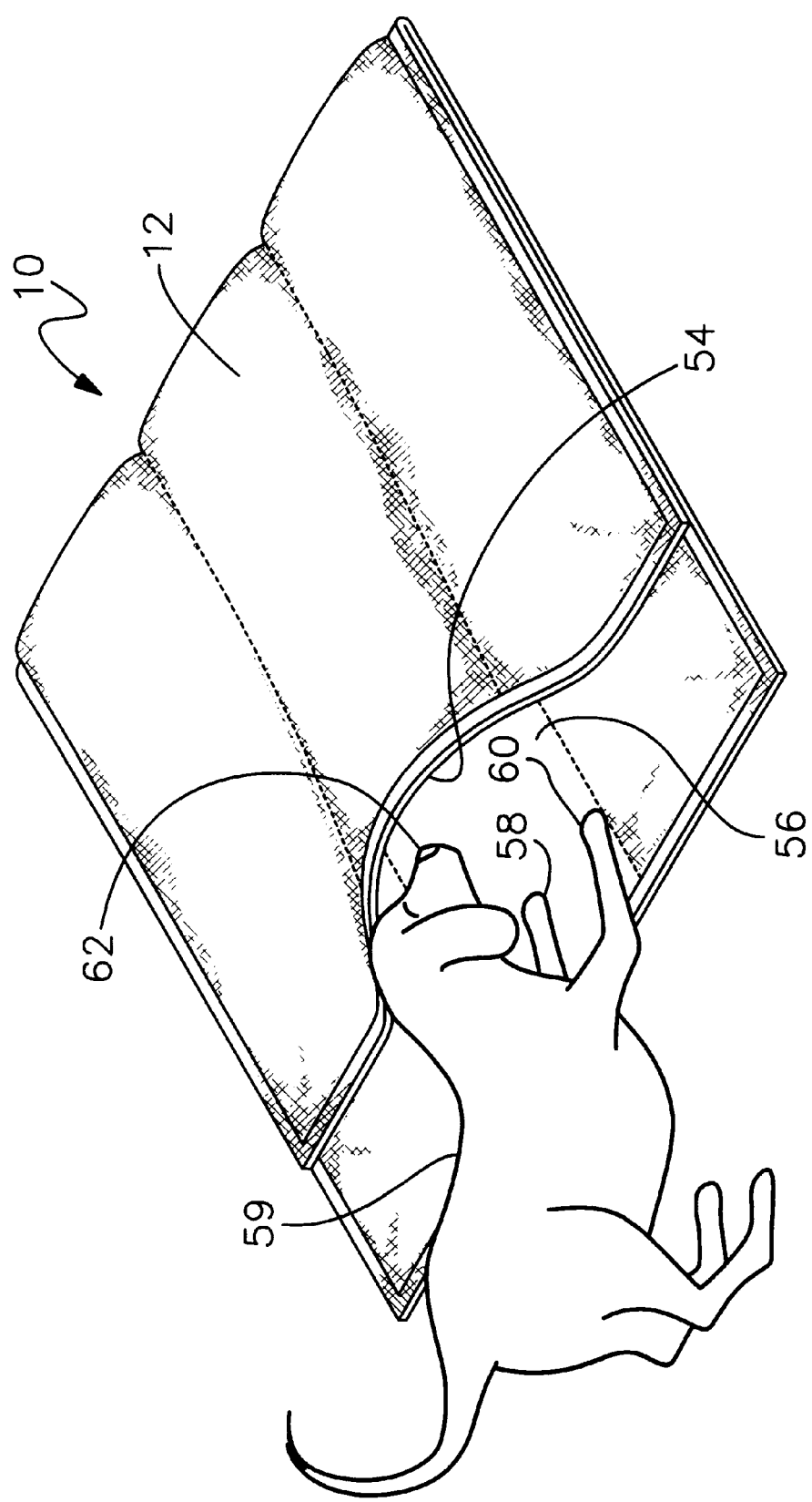
FIG. 5 is another section view of the pet sleeping bag of FIG. 1 showing the pet entering the bag.

It is important that the sleeping bag maintain its shape during use to more readily permit the pet to enter the sleeping bag. Front edge 52 of lower fabric member 14 extends beyond the front edge 54 of upper fabric member 12, thereby forming shelf 56. At least a portion of front edge 54 is not attached to lower fabric member 14 so as to provide an opening in enclosure 24 to permit the pet to easily enter therein. In addition, shelf 56 provides a place for the pet's front paws 58 and 60, as illustrated in FIG. 5, to be placed thereon so that the pet 59 may hold the sleeping bag 10 in a fixed position while entering the sleeping bag. In addition, the shelf 56 enables the pet 59 to place its nose 62 under front edge 54 of upper fabric member 12, again, to aid the pet in entering the sleeping bag. Preferably, the front edge 52 of lower fabric member 14 extends at least three inches from said front edge 54 of said upper fabric member 12 for providing sufficient room for the pet to place its front paws on shelf 56 and to permit the pet's nose to burrow under front edge 54.

From the foregoing description of the preferred embodiment of the invention, it will be apparent that many modifications may be made therein. It should be understood, however, that this embodiment of the invention is an exemplification of the invention only and that the invention is not limited thereto. It is to be understood, therefore, that it is intended in the appended claims to cover all modifications as fall within the true spirit and scope of the invention.

What is claimed is:

1. A sleeping bag for pets comprising:
   an upper fabric member and a lower fabric member; said upper and lower fabric members each having first and second side edges and a front edge; said first side edge of said upper fabric member being attached to said first side edge of said lower fabric member along a substantial portion of the length thereof, and said second side edge of said upper fabric member being attached to said second side edge of said lower fabric member along a substantial portion of the length thereof, thereby forming an enclosure;
   said front edge of said upper fabric member not being attached to said lower fabric member, thereby forming an opening for said enclosure along the entire length of said front edge of said upper fabric member; said front edge of said lower fabric member extending beyond said front edge of said upper fabric member, thereby forming a shelf from a portion of said lower fabric member extending from said first side edge of said lower fabric member to said second side edge of said lower fabric member, whereby the pet may readily enter said enclosure;
   said bag being devoid of any zipper or drawstring structure which may interfere with the ability of the pet to enter said bag.

2. A sleeping bag as set forth in claim 1, wherein said upper and lower fabric members are formed from a plurality of adjacent panels; said adjacent panels being sewn together, forming a valley between adjacent panels.

3. A sleeping bag as set forth in claim 2, further including a rib within each of said valleys for providing structural strength for said bag.

4. A sleeping as set forth in claim 3, further including a bordering member attached to said first and second side edges and said front edges of said upper and lower fabric members for providing structural strength for said bag.

5. A sleeping bag as set forth in claim 2, wherein each panel includes upper and lower walls; filler material located between said upper and lower walls for providing structural strength for said bag and for providing thermal insulation.

6. A sleeping bag as set forth in claim 1, wherein said front edge of said lower fabric member extends at least three inches from said front edge of said upper fabric member.

7. A sleeping bag for pets comprising:
   an upper fabric member and a lower fabric member; said upper and lower fabric members each having first and second side edges and a front edge; said first side edge of said upper fabric member being attached to said first side edge of said lower fabric member along a substantial portion of the length thereof, and said second side edge of said upper fabric member being attached to said second side edge of said lower fabric member along a substantial portion of the length thereof, thereby forming an enclosure;
   said front edge of said upper fabric member not being attached to said lower fabric member, thereby forming an opening for said enclosure along the entire length of said front edge of said upper fabric member; said front edge of said lower fabric member extending at least three inches beyond said front edge of said upper fabric member, thereby forming a shelf from a portion of said lower fabric member extending from said first side edge of said lower fabric member to said second side edge of said lower fabric member, whereby the pet may readily enter said enclosure;
   said upper and lower fabric member formed from a plurality of adjacent panels; said adjacent panels being sewn together, forming a valley between each adjacent panel;
   a rib included in each valley;
   a bordering member attached to said first and second side edges and said front edges of each of said first and second fabric members;
   each panel including upper and lower walls;
   filler material located between said upper and lower walls;
   said bag being devoid of any zipper or drawstring structure which may interfere with the ability of the pet to enter said bag.

* * * * *